United States Patent [19]

Inoue et al.

[11] Patent Number: 5,445,908
[45] Date of Patent: Aug. 29, 1995

[54] ALKALINE DRY CELL

[75] Inventors: Koichi Inoue, Hirakata; Kazutoshi Okubo, Nara; Kohei Kitagawa, Toyonaka; Keisuke Tanaka, Hirakata; Tomoya Watanabe, Toyonaka, all of Japan

[73] Assignee: Matsushita Electric Industrial Co., Ltd., Osaka, Japan

[21] Appl. No.: 958,717

[22] Filed: Oct. 9, 1992

[30] Foreign Application Priority Data

Oct. 17, 1991 [JP] Japan .................................. 3-269218
Oct. 17, 1991 [JP] Japan .................................. 3-269226
Mar. 23, 1992 [JP] Japan .................................. 4-064577
Jul. 7, 1992 [JP] Japan .................................. 4-179588

[51] Int. Cl.$^6$ .......................................... H01M 4/66
[52] U.S. Cl. ................................. 429/229; 429/245
[58] Field of Search ............................ 429/229, 245

[56] References Cited

U.S. PATENT DOCUMENTS 4,992,343 2/1991 Nordi .................................. 429/57
5,112,705 5/1992 Hunter et al. ..................... 429/206

FOREIGN PATENT DOCUMENTS 0080064 6/1983 European Pat. Off. .
0415607 3/1991 European Pat. Off. .
3246957 6/1984 Germany .
55-83168A 6/1980 Japan .
58-155653 9/1983 Japan .
60-227354 11/1985 Japan .
60-227359A 11/1985 Japan .
61-56285 3/1986 Japan .
315156A 1/1991 Japan .

*Primary Examiner*—Stephen Kalafut
*Assistant Examiner*—M. Nuzzolillo
*Attorney, Agent, or Firm*—Stevens, Davis, Miller & Mosher

[57] ABSTRACT

The present invention provides an alkaline dry cell which has a negative electrode comprising zinc alloy powders free of mercury as a negative electrode active material and provided in the center portion of the cell, a positive electrode provided around the outer surface of the negative electrode with a separator provided therebetween and a current collector comprising copper or a copper alloy and inserted in the negative electrode and which is inhibited from generation of hydrogen gas and from leakage of liquid. This alkaline dry cell is characterized in that the surface of the current collector is plated with a metal of high hydrogen overvoltage such as tin, lead, copper, zinc or an alloy of two or more of these metals.

2 Claims, 3 Drawing Sheets

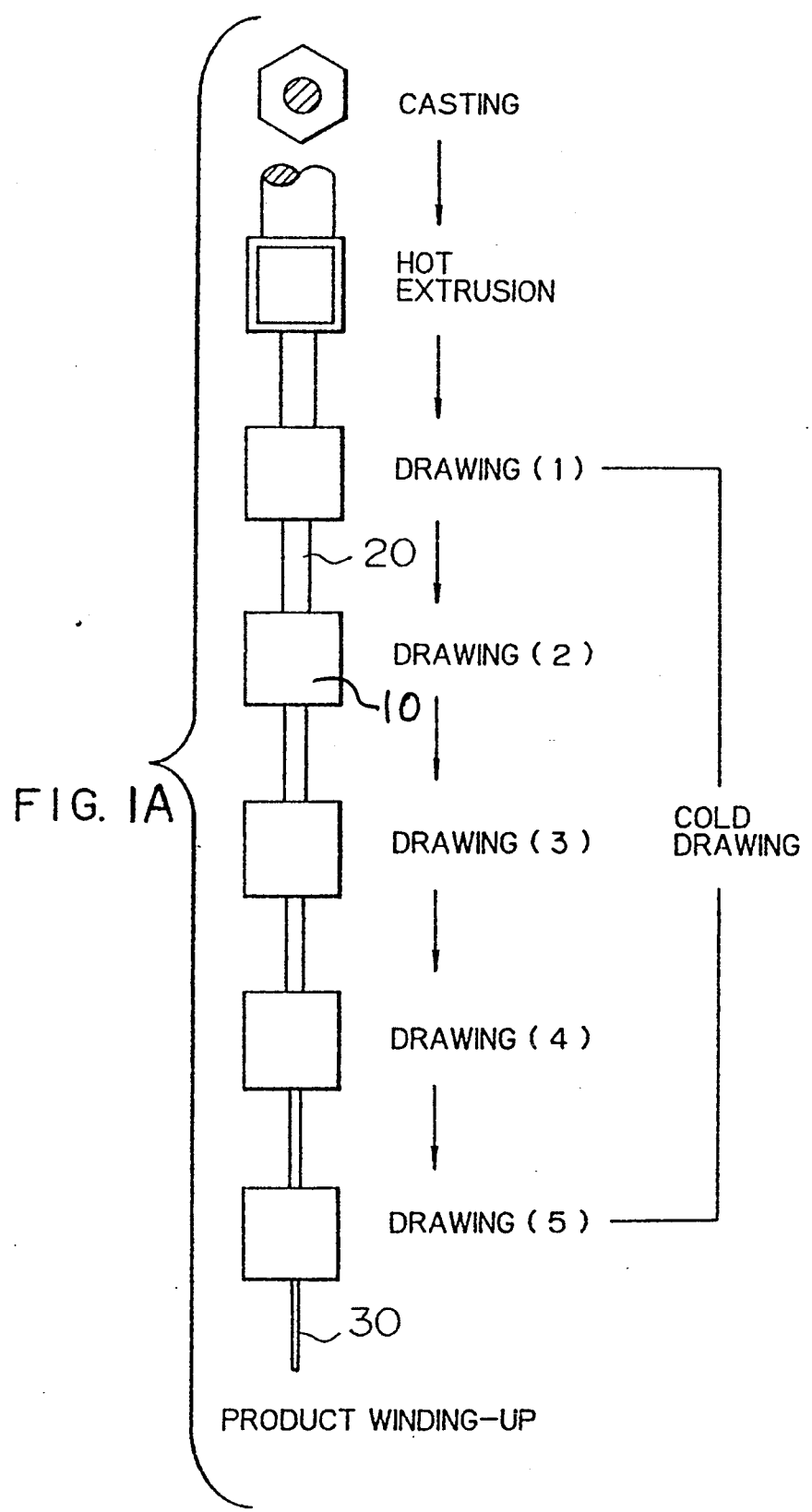

ALKALINE DRY CELL

BACKGROUND OF THE INVENTION

The present invention relates to a negative electrode current collector of an alkaline dry cell and more particularly, it relates to a negative electrode current collector capable of inhibiting generation of hydrogen gas and providing an improved liquid-leakage resistance for an alkaline dry cell using a mercury-free zinc alloy powder as a negative electrode active material and which use the negative electrode current collector of the present invention.

In alkaline dry cells using zinc as a negative electrode active material, hydrogen gas is generated owing to corrosion reaction of zinc during storage of the cells, resulting in increase of internal pressure of the cells to cause ejection of the electrolyte from the cells and thus, the leakage resistance of the cells decreases. In some cases, bursting of the cells may be brought about.

As a countermeasure against these problems, it has been generally conducted to use an amalgamated zinc powder containing mercury as a negative electrode active material in order to increase hydrogen overvoltage of zinc as a negative electrode active material to thereby inhibit corrosion of zinc and generation of hydrogen gas in the cells. As a current collector for the zinc negative electrode, copper or copper alloys have hitherto been generally used, and the surface of the current collector is amalgamated upon contacting with the amalgamated zinc negative electrode. Furthermore, Japanese Patent Kokaii (Laid-Open) Nos. 58-155653 and 61-56285 propose to remove impurities, especially, Fe, Ni, Cr, Co, Mo and W and oxides thereof, from the surface of the current collector, which promote corrosion of zinc, and to cleanse or polish the surface of the current collector with an alkali degreasing solution or chemical polishing solutions such as acids and hydrogen peroxide before fabrication of the cells to inhibit generation of hydrogen gas.

However, even when the current collector subjected to the cleansing or chemical polishing is used, alkaline dry cells which are excellent in corrosion resistance, reduced in fluctuation of quality and highly stabilized in quality have not yet been obtained with a zinc alloy powder free from mercury as the negative electrode active material. This is for the following reasons.

As materials for the negative electrode current collectors of alkaline dry cells, copper or copper alloys such as brass are generally used. These materials are drawn through several wire making steps as shown in FIG. 1 attached hereto to have a desired diameter. Molds used for the drawing are generally made of cemented carbide steels or hot tool steels and hence, the surface of the current collectors made of copper or copper alloys has fine fragments of a metal such as iron and nickel adhered thereto. In many cases, the fine fragments bite into and stick to the surface.

Therefore, the fine fragments cannot completely be removed by a conventional alkali degreasing treatment and may cause generation of hydrogen gas after fabrication of the cells.

Furthermore, even the polishing by an acid or chemical polishing agent which has a more effective cleansing action cannot completely remove the fine fragments which deeply bite into and stick to the surface of current collector, and the remaining fragments cause generation of hydrogen gas.

SUMMARY OF THE INVENTION

The object of the present invention is to solve the above problems in the conventional alkaline dry cells, namely, to inhibit generation of hydrogen gas, improve liquid-leakage resistance and reduce fluctuation in quality and stabilize the quality of the cells, even when a zinc alloy powder free from mercury is used in the alkaline dry cells.

As a result of intensive studies conducted by the inventors for attaining the object, it has been found that when a zinc alloy powder free from mercury is used in alkaline dry cells, impurities which stick to the surface of current collectors, especially, fine fragments such as of Fe, Ni, Cr, Co, Mo, W or oxides thereof which can easily stick during preparation of wires for current collectors, promote generation of hydrogen. It has further been found that part of the collector at which hydrogen gas is continuously generated is on the surface of the current collector, on which a slight amount of the impurities are partially present. Based on these findings, the present invention has been accomplished, according to which generation of hydrogen can be inhibited and corrosion resistance can be improved by hiding the impurities sticking to the surface of the current collector by plating them with a metal of high hydrogen overvoltage. The plating is preferably as electroless plating of the current collector with a metal containing at least one member selected from the group consisting of Sn, Pb and Cu.

If fine fragments of a metal such as of Fe, Ni, Cr, Co, Mo, W or oxides thereof stick to the surface of a current collector made of copper or a copper alloy, hydrogen gas is generated when this current collector is used in a zinc negative electrode of an alkaline dry cell, since the hydrogen overvoltage of the fine fragments is low.

Especially when a zinc alloy powder free from mercury is used as a negative electrode active material for alkaline dry cells, a much larger amount of hydrogen gas is generated than when the amalgamated zinc alloy powder is used. Therefore, the fine impurities such as Fe, Ni, Cr, Co, Mo and W and oxides thereof which stick to and bite into the current collecting rod during the production thereof can be covered and hidden by plating the impurities with a metal of high hydrogen overvoltage. Accordingly, even when the current collector of the present invention is used in a negative electrode active material of the zinc alloy powder free from mercury, there can be provided a mercury-free alkaline dry cell which is high in quality, excellent in leakage resistance and inhibited from generation of hydrogen gas. The metal to be plated for covering and hiding the impurities is preferably one or more tin, lead, copper and zinc, or an alloy of two or more of these metals.

BRIEF DESCRIPTION OF THE DRAWINGS

FIG. 1A is a flow sheet of making a copper or copper alloy wire used as a current collector.

DESCRIPTION OF THE PREFERRED EMBODIMENTS

The present invention will be more specifically illustrated below with references to the following Examples and Comparative Examples.

EXAMPLE I

Negative electrode current collectors of 1.5 mm in diameter and 30 mm in length were made from brass wires 30 obtained through the steps shown in FIG. 1A and subjected to electroless Sn plating with a plating solution comprising 6 g/l of stannous chloride, 55 g/l of thiourea and 40 g/l of tartaric acid to form platings of 0.05 μm, 0.10 μm, 0.15 μm and 0.20 μm in thickness. Separately, the current collectors were subjected to electrolytic plating to form a Sn plating of 5.0 μm and 10.0 μm in thickness. Furthermore, negative electrode current collectors having a Sn plating of 0.5 μm, 1.0 μm and 1.5 μm in thickness were prepared by a dipping method, i.e., a non-electrochemical plating method.

Figure 1B:
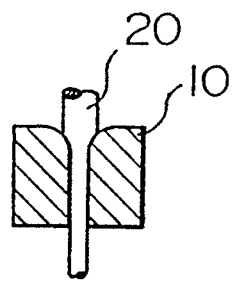
FIG. 1B is a partial enlarged view of FIG. 1A.

FIG. 1B is a partial enlarged view showing a cross-section of block 10 with element 20 extending therethrough.

Figure 2:
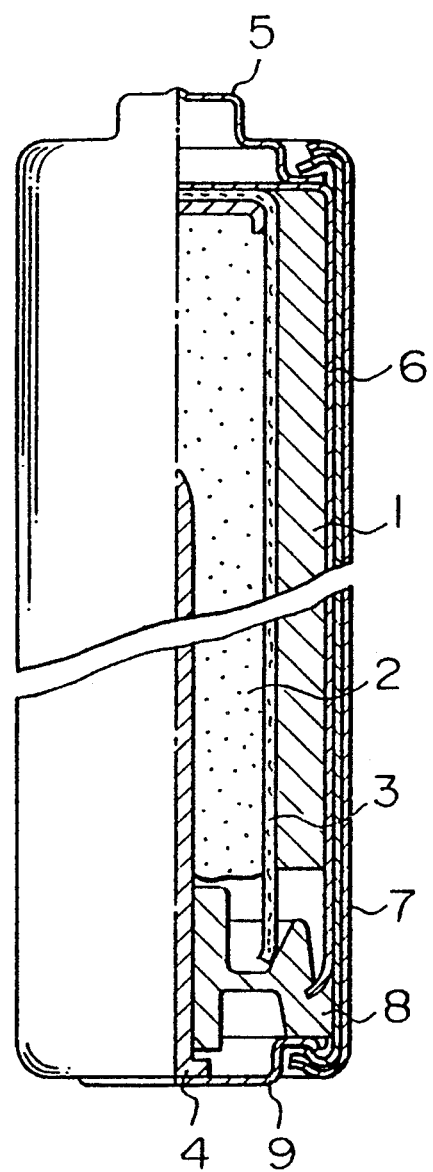
FIG. 2 is a side cross-sectional view of an alkaline dry cell LR6.

Alkaline manganese cell LR6 as shown in FIG. 2 was fabricated using the above negative electrode current collectors to obtain cells of Examples 1, 2, 3, 4, 5, 6, 7, 8 and 9. In FIG. 2, 1 indicates a positive electrode depolarizing mix prepared by molding a mixture of manganese dioxide and graphite as a conductive material, 2 a gel-like zinc negative electrode prepared by dispersing zinc alloy powders free of mercury and a gelling agent in an alkaline electrolyte in which potassium hydroxide was dissolved, 3 a separator, 4 a negative electrode current collector, 5 a positive electrode terminal cap, 6 a metallic case, 7 an outer can of cell, 8 a sealing gasket, and 9 a bottom plate which constitutes a negative electrode terminal.

Comparative Examples

Alkaline dry cells LR6 of Comparative Examples A and B were fabricated using the following negative electrode current collectors in the same manner as in Example I.
A—A brass current collector cleansed with an alkali degreasing agent.
B—A brass current collector chemically polished with a mixture of hydrogen peroxide and sulfuric acid.

10000 cells of each of the Examples and the Comparative Examples above were stored at room temperature for 3 months. The number of cells in which leakage of liquid occurred (visual inspection) is shown in Table 1. From the results shown in Table 1, it is seen that no leakage of liquid occurred in the cells of Examples 1–4 of the present invention in which the current collectors had a plating of 0.1 μm or more in thickness formed by electroless plating and practical leakage resistance could be ensured in these cells. However, when the thickness of the plating was 0.05 μm, leakage of liquid occurred. In the cells in which the leakage occurred, a large amount of gas was generated and Fe, Cr, Ni and the others were detected on the surface of the current collectors. It is considered that this is because the Sn plating of 0.05 μm or less in thickness formed by electroless plating cannot completely hide the fine fragments which bite into the surface of the current collector, such as Fe, Cr and Ni. The occurrences of liquid leakage in Examples 5 and 6 are greatly reduced as compared with those in Comparative Examples A and B.

As is seen, the electroless plating is advantageous over the electrolytic plating. This is considered because the electroless plating makes it also possible to more uniformly plate depths of flaws or recesses and completely hide fine fragments of Fe, Ni, Cr or etc. deeply biting in the depths. Moreover, as can be seen from the results of Examples 7, 8 and 9, when the plating on current collectors was carried out by dipping, no leakage of liquid occurred and the impurities on the surface of the current collectors were completely hidden. On the other hand, in Comparative Examples A and B, leakage occurred in many cells and Fe, Cr, Ni and the others were detected on the surface of all current collectors. It is considered that this is because only the grease on the surface of current collectors was removed by the cleansing with alkali degreasing agents and the harmful metals such as Fe, Cr and Ni to be removed were not removed in view of the action of the degreasing agents in Comparative Example A. The chemical polishing in Comparative Example B could remove the fine impurities which merely adhered to the surface, but could not dissolve those which deeply bit into the surface.

The tests shown in the following Examples were also conducted on lead, copper and alloys thereof.

EXAMPLE II

Current collectors of 1.5 mm in diameter and 30 mm in length were made from brass wire 30 obtained through the steps shown in FIG. 1A and were subjected to electroless Pb plating with a plating solution comprising 4 g/l of lead monoxide, 26 g/l of sodium cyanide and 105 g/l of sodium hydroxide to form Pb platings of 0.05 m, 0.10 m, 0.15 m and 0.20 m in thickness. Then, alkaline dry cells LR6 were fabricated in the same manner as in Example I and the test results on the leakage conducted in the same manner as in Example I are shown in Table 2.

EXAMPLE III

Current collectors of 1.5 mm in diameter and 30 mm in length were made from brass wire 30 obtained through the steps shown in FIG. 1A and were subjected to electroless Cu plating with a plating solution prepared from copper sulfate, potassium sodium tartrate, sodium hydroxide, formaldehyde and thiourea to form Cu platings of 0.05 μm, 0.10 μm, 0.15 μm and 0.20 μm in thickness. Then, alkaline dry cells LR6 were fabricated in the same manner as in Example I and the test results on the leakage conducted in the same manner as in Example I are shown in Table 3.

EXAMPLE IV

Negative electrode current collectors of 1.5 mm in diameter and 30 mm in length were made from brass wires 30 obtained through the steps shown in FIG. 1A and were subjected to electroless Sn—Pb alloy plating with a plating solution Technofuse manufactured by Shimizu K. K. to form platings of 0.05 μm, 0.10 μm, 0.15 μm and 0.20 μm in thickness. Then, alkaline dry cells LR6 were fabricated in the same manner as in Example I and the test results on the leakage conducted in the same manner as in Example I are shown in Table 4.

As shown in Tables 2, 3 and 4, the effect to hide the impurities could also be confirmed on plating with lead, copper and alloys thereof as in the case of plating with tin.

TABLE 1

|  |  | Surface treatment of current collector | The number of cells LR6 in which leakage of liquid occurred after stored for 3 months at room temperature (Visual inspection) |
|---|---|---|---|
| Example | 1 | Electroless Sn plating 0.05 μm | 15/50000 |
|  | 2 | Electroless Sn plating 0.10 μm | 0/50000 |
|  | 3 | Electroless Sn plating 0.15 μm | 0/50000 |
|  | 4 | Electroless Sn plating 0.20 μm | 0/50000 |
|  | 5 | Electrolytic Sn plating 5.0 μm | 10/50000 |
|  | 6 | Electrolytic Sn plating 10.0 μm | 8/50000 |
|  | 7 | Dip Sn plating 0.5 μm | 0/50000 |
|  | 8 | Dip Sn plating 1.0 μm | 0/50000 |
|  | 9 | Dip Sn plating 1.5 μm | 0/50000 |
| Comparative Example | A | Cleansing by alkali degreasing | 80/50000 |
|  | B | Chemical polishing Hydrogen peroxide and sulfuric acid | 45/50000 |

TABLE 2

|  |  | Surface treatment of negative electrode current collector | The number of cells LR6 in which leakage of liquid occurred after stored for 3 months at room temperature (Visual inspection) |
|---|---|---|---|
| Example | 1 | Electroless Pb plating 0.05 μm | 20/50000 |
|  | 2 | Electroless Pb plating 0.10 μm | 0/50000 |
|  | 3 | Electroless Pb plating 0.15 μm | 0/50000 |
|  | 4 | Electroless Pb plating 0.20 μm | 0/50000 |

TABLE 3

|  |  | Surface treatment of negative electrode current collector | The number of cells LR6 in which leakage of liquid occurred after stored for 3 months at room temperature (Visual inspection) |
|---|---|---|---|
| Example | 1 | Electroless Cu plating 0.05 μm | 15/50000 |
|  | 2 | Electroless Cu plating 0.10 μm | 0/50000 |
|  | 3 | Electroless Cu plating 0.15 μm | 0/50000 |
|  | 4 | Electroless Cu plating 0.20 μm | 0/50000 |

TABLE 4

|  |  | Surface treatment of current collector | The number of cells LR6 in which leakage of liquid occurred after stored for 3 months at room temperature (Visual inspection) |
|---|---|---|---|
| Example | 1 | Electroless Sn—Pb alloy plating 0.05 μm | 15/50000 |
|  | 2 | Electroless Sn—Pb alloy plating 0.10 μm | 0/50000 |
|  | 3 | Electroless Sn—Pb alloy plating 0.15 μm | 0/50000 |
|  | 4 | Electroless Sn—Pb alloy plating 0.20 μm | 0/50000 |

As explained above, when the current collector of the present invention is used, an excellent alkaline dry cell inhibited from generation of hydrogen gas and leakage of liquid can be obtained even if a powdered zinc alloy containing no mercury is used as the negative electrode active material of the cell.

What is claimed is:

1. An alkaline dry cell which has a negative electrode comprising zinc alloy powders free of mercury as a negative electrode active material and provided in a center portion of the cell, a positive electrode provided around an outer surface of the negative electrode with a separator provided therebetween and a current collector comprising copper or a copper alloy and inserted in the negative electrode wherein the surface of said current collector is of subjected to an electroless plating with a metal containing at least one member selected from the group consisting of Sn, Pb and Cu.

2. An alkaline dry cell according to claim 1, wherein the thickness of the electroless plating is 0.1 μm or more.

* * * * *